Nov. 23, 1965 A. I. STERN, JR., ET AL 3,219,148
CHECKOUT SYSTEM
Filed March 23, 1961 2 Sheets-Sheet 1

INVENTORS,
ARTHUR I. STERN JR. &
SOL GOTTLIEB
BY
Baldwin & Martin
ATTORNEYS

INVENTORS
ARTHUR I. STERN JR. &
SOL GOTTLIEB
BY
Baldwin & Martin
ATTORNEYS

United States Patent Office 3,219,148
Patented Nov. 23, 1965

3,219,148
CHECKOUT SYSTEM
Arthur I. Stern, Jr., and Sol Gottlieb, Jacksonville, Fla., assignors of one-third to Investment Brokers, Inc., Jacksonville, Fla., a corporation of Florida
Filed Mar. 23, 1961, Ser. No. 97,910
9 Claims. (Cl. 186—1)

This invention relates to a checkout system for self-service stores, and more particularly concerns an improved shopping cart and checkout counter apparatus.

A general object of this invention is to provide an improved checkout system.

A further object of this invention is the provision of a shopping cart and checkout counter apparatus in which the handling and checking of selected items of merchandise from the cart is simplified and facilitated.

A particular object of this invention is to provide an improved checkout counter which permits the direct removal of mechandise from a shopping basket and the checking of each item by the checker-cashier.

A specific object of this invention is the provision of an improved shopping cart in which the basket may be readily removed from the wheeled base when either the basket or base is damaged for repair or replacement thereof, or when the merchandise within the basket is to be checked.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Figure 1:
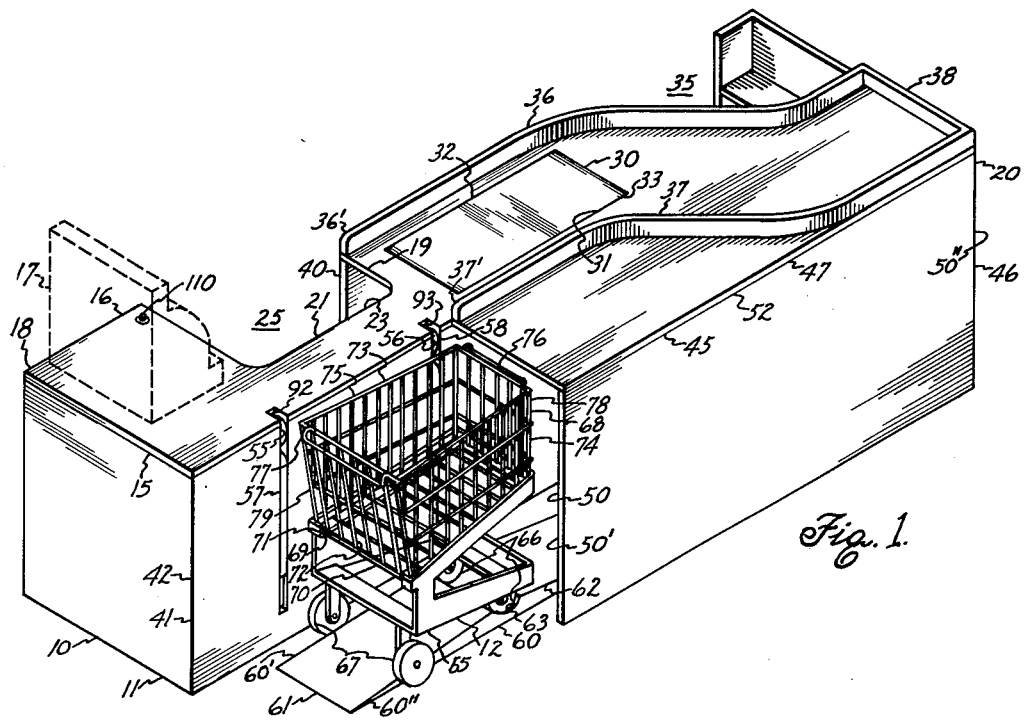
FIG. 1 is a perspective view seen from the customer's side of the checkout system in accordance with the present invention, including a cash register in broken lines.

Referring now more particularly to the drawings, a checkout system is designated generally at 10 and comprises an elongated counter 11 and a shopping cart 12. Counter 11 comprises a substantially horizontal top 15 having a supporting portion 16 on which a cash register 17, shown in broken lines in FIG. 1, may be positioned adjacent the forward end 18 of counter 11. A merchandise receiving portion 19 of top 15 is provided adjacent the other end 20 of conuter 11. Interconnecting the supporting portion 16 and receiving portion 19 is a narrow portion 21 of top 15. As shown, top 15, having a cut-out portion 23 which is bounded by portions 16, 19 and 21, forms a checker-cashier station, generally indicated at 25, at which a checker-cashier may check out the merchandise selected by the customer.

A selectively operable conventional conveyor 30 is mounted within the opening 31 in the receiving portion 19 of top 15. Conveyor 30 operates to transport merchandise depostited thereon by the checker-cashier from the checker-cashier station 25 to the bagging station, generally indicated at 35, at which a bag boy removes and packages the merchandise so conveyed into bags or other receptacles. Mounted on top 15 are substantially parallel, curved guide rails 36 and 37, in the general form of an S, which are positioned on respective opposite sides 32 and 33 of the conveyor 30. A bottom rail 38 is placed between rails 36 and 37 at the rearward end 20 of counter 11, and the rails 36, 37 and 38 retain the checked merchandise on top 15 of the counter 11 in a readily accessible position for the bag boy standing at the bagging station 35.

Side 40 of counter 11 is seen to be indented by the checker-cashier station 25 and the bagging station 35, and the opposite elongated side 41 is covered by a panel 42 which faces the customer and extends from end 18 to end 20 of counter 11. Top 15 extends outwardly from side 41 to form a display portion 45 thereon. An offset side panel 46 is substantially parallel to and spaced from panel 42, panel 46 being connected along the outer edge 47 of top 15. A passageway 50 is formed between panels 42 and 46 and beneath top 15 through which the shopping cart 12 may pass, as will be more fully described hereinafter.

As shown, the forward end 37' of rail 37 is positioned above panel 42 and rail 37 terminates at end 20 of counter 11 above offset panel 46. The forward end 36' of rail 36 is positioned above side 40 of counter 11 and rail 36 terminates at end 20 of counter 11 above side 41 thereof. This arrangement of the elongated curved merchandise receiving portion 19 effectively uses the passageway covering portion 52 of top 15 and permits the bagging station 35 to be within the narrow confines of the counter 11.

A pair of vertical slots 55 and 56 are provided within panel 42 adjacently below the narrow portion 21 of top 15 and adjacent the checker-cashier station 25. Respective elongated arms 57 and 58 are positioned within slots 55 and 56 and are pivotally mounted, as shown in FIGS. 3 to 6, as will be more specifically described hereinafter.

A guideway ramp 60, having a predetermined width, is positioned substantially parallel to the narrow portion 21 of top 15 alongside of panel 42. Ramp 50 includes an upwardly extending forward portion 61 and a downwardly extending rearward portion 62 which extends into passageway 50. Interposed between end portions 61 and 62 is a positioning means for accurately orienting cart 12 in the proper position adjacent checker-cashier station 25, the means herein shown as being a recess 63 within ramp 60.

Figure 2:
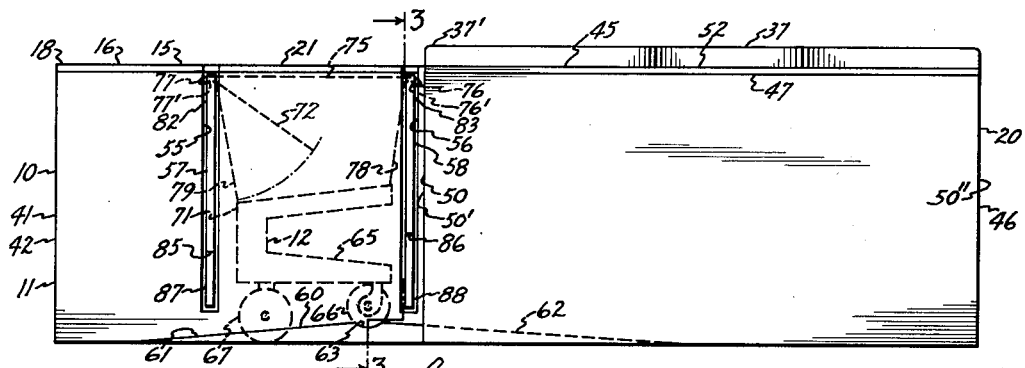
FIG. 2 is a side elevation of the checkout system of FIG. 1, including the shopping cart in broken lines.

The shopping cart 12 comprises an elongated base 65 movably mounted on front and rear wheels 66 and 67 and an elongated basket 68 removably supported on base 65. The base 65 includes an inwardly extending ledge 69 on which the bottom 70 of basket 68 is seated, and an upwardly extending edge portion 71 at least partially surrounds basket 68. The basket 68 is provided with an inwardly swinging back 72 and inwardly converging sides 73 and 74 which permit the forward end of another basket to telescope within basket 68, in a conventional manner. As seen in FIG. 2, the upper edge 75 of basket 68 is substantially parallel with top 15 of counter 11 when the front wheels 66 are seated within recess 63 of ramp 60. When the cart 12 is not elevated, wheels 66 being off ramp 60 and resting on level plane with wheels 67, the upper edge 75 slants downwardly for the purpose of properly telescoping within another basket carrying shopping cart. A pair of outwardly extending lift means in the form of flanges 76 and 77 are respectively attached to the basket 68 at its opposite ends 78 and 79 adjacent the upper edge 75 of the basket 68. The rear flange 77 serves as a handle for the customer in pushing the cart 12 through the store while selecting the desired merchandise. Front flange 76 serves as a handle for removing cart 12 from passageway 50 at end 20 of counter 11.

In operation cart 12 is moved into position on the ramp 60 after basket 68 is filled with the selected merchandise, the customer pushing on handle 77 and moving the cart 12 forwardly. Wheels 66 will move up ramp portion 61 and thereafter wheels 67 will straddle ramp 60 on its opposite sides 60′ and 60″. When wheels 66 are within recess 63, the cart 12 is properly positioned adjacent the checker-cashier station 25. The arms 57 and 58 are pivoted to swing outwardly from side 41 of counter 11 and respectively swing beneath flanges 77 and 76 for engagement with basket 68. The arms 57 and 58 continue swinging upwardly to lift basket 68 from base 65 and tilt basket 68 into a readily accessible position adjacent the checker-cashier station 25, shown in FIG. 6. The checker-cashier may directly and easily remove the merchandise from the tilted basket 68, checks and deposits the merchandise on the receiving portion 19, thereafter conveyor 30 moves the deposited merchandise to the bagging station 35. After basket 68 is unloaded the arms 57 and 58 are pivoted downwardly to lower basket 68 on base 65. Cart 12 is then pushed by the checker-cashier down ramp portion 62 and cart 12 enters into passageway 50 for storage therewithin, as will be described hereinafter.

Figure 3:
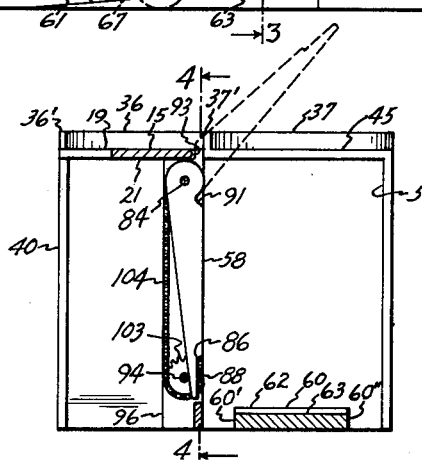
FIG. 3 is a transverse sectional view taken along line 3—3 of FIG. 2.
Figure 4:
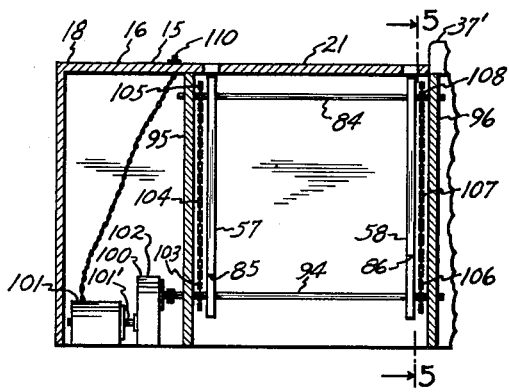
FIG. 4 is a partial transverse sectional view taken along line 4—4 of FIG. 3.
Figure 5:
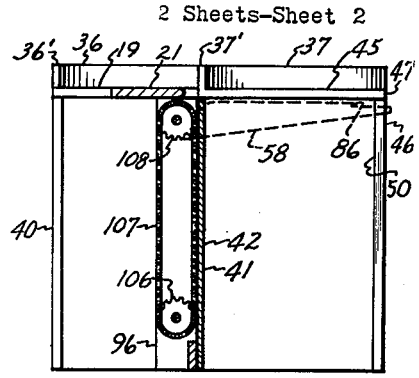
FIG. 5 is a transverse sectional view taken along line 5—5 of FIG. 4.

As shown in FIGS. 2 and 3, the arms 57 and 58, having respective upper ends 82 and 83 secured to shaft 84, are provided with notched portions 85 and 86 adjacent the respective lower free ends 87 and 88. The laterally extending portions 76′ and 77′ of the respective flanges 76 and 77 nest within the respective notched portions 86 and 85 of arms 58 and 57 to prevent sliding of basket 68 toward the counter 11 while the basket 68 is being tilted. The respective arms 57 and 58 are provided with upper stop means in the form of notches 90 and 91 which engage the narrow portion 21 of top 15 at 92 and 93 to limit the upward swinging movement of arms 57 and 58. The lower limit for the swinging arms 57 and 58 is provided by lower shaft 94, as shown in FIGS. 3 and 4. Basket 68 may accordingly be lifted by tilting the basket from its horizontal position shown in FIG. 1 to its tilted position shown in FIG. 6. While the tilting angle with respect to the horizontal top 15 is shown as being about 40°, it is to be understood that the basket may only be tilted about 30° or it may be tilted upwardly to about 65° or 70° depending on the accessibility of the bottom of the basket to the checker-cashier.

Arms 57 and 58 are pivotally mounted by upper shaft 84, shaft 84 being rotatably mounted between counter supports 95 and 96 extending vertically downwardly from narrow portion 21 of top 15. The mechanism for pivoting arms 57 and 58 is designated generally at 100 in FIG. 4 and comprises an electrically reversible motor 101 coupled to a gear reduction box 102 which in turn is drivingly connected to lower shaft 94. Driving sprockets 103 and 106 are mounted on driving shaft 94, sprockets 103 and 106 being respectively connected to driven sprockets 105 by chains 104 and 108. A momentary double throw hand switch 110 is mounted on top 15, but it is to be understood that a foot operated switch may be substituted therefor. Switch 110 controls the direction of rotation of the motor shaft 101, the direction of rotation of shaft 84 and correspondingly the raising and lowering of arms 57 and 58.

Figure 6:
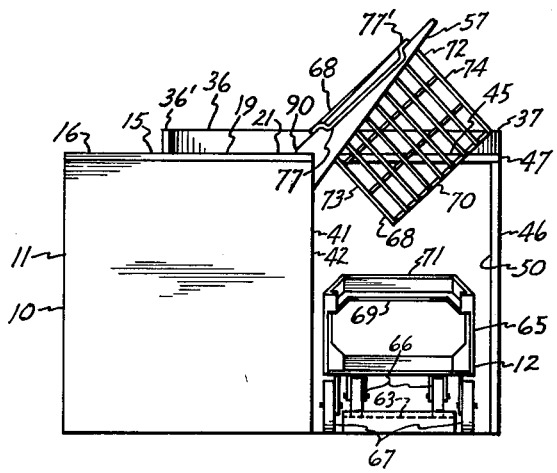
FIG. 6 is an end elevational view of the checkout system of FIG. 1, including the arms operatively removing the shopping basket from the wheeled base of the cart.

After a cart 12 is properly positioned on ramp 60 adjacent arms 57 and 58, the switch 110 is activated by the checker-cashier to cause shaft 84 to rotate in a direction to swing arms 57 and 58 outwardly from the position shown in FIG. 1 beneath counter 11 to the position shown in FIG. 6 above counter 11, or to any selected position therebetween. The basket 68 is raised and tilted to the appropriate position selected which renders the basket 68, and the merchandise therein, readily accessible to the checker-cashier. When the basket 68 is completely unloaded, the basket 68 is lowered onto base 65 of cart 12 by activating the switch 110 to reverse the motor 101, causing shaft 84 to rotate in the reverse direction, to swing arms 57 and 58 downwardly to the lower position shown in FIG. 1. Thereafter, cart 12 is pushed into passageway 50, as hereinbefore described.

Counter 10 provides a parking area for a plurality of shopping carts which nestingly telescope within each other, the parking area being beneath top 15. As shown, elongated passageway 50, having a forward end 50′ adjacent narrow portion 21 and a rearward end 50″ adjacent end 20 of counter 11, provides a parking area for a plurality of carts, the entrance for the carts being at forward end 50′ and the exit being at rearward end 50″. Periodically the carts within passageway 50 may be removed from the exit end 50″ by the incoming customers directly or the bag boy may remove a plurality therefrom for replenishing the cart storage area which may become depleted by incoming customers.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a checkout system comprising a counter having a checker-cashier station, a shopping cart positioned adjacent said station, said cart including a removable basket supported on a base, said basket having flanges on respective opposite ends thereof, a pair of arms pivotally mounted to said counter adjacent said station, means for selectively pivoting said arms into respective engagement beneath said flanges to remove said basket from said base and to position said basket in a readily accessible tilted position adjacent said station.

2. In a checkout system comprising a shopping cart having a base movably mounted on wheels and a basket removably supported on said base, said basket having opposite ends and outwardly extending flanges respectively connected to said ends, an elongated counter having a checker-cashier station on one of its elongated sides, a ramp positioned adjacent said station on the other elongated side of said counter, a pair of spaced pivotally mounted arms positioned adjacent said station, said ramp including means for accurately positioning said wheels in a predetermined location so that said basket is adjacent said arms and station, selectively operable tilting means for pivoting said arms into engagement with said flanges and for tilting said basket into a readily accessible inclined position adjacent said station.

3. In a checkout system comprising an elongated counter having a substantially horizontal top and a checker-cashier station on one of the elongated sides of said counter, a pair of spaced arms respectively having opposite ends, mounting means pivotally supporting each said arm at one of its said opposite ends, selectively operable means for pivoting said arms and for swinging the other end of each of said arms between a vertically downward position and an inclined upward position relative to said horizontal top, a shopping cart having a base and a basket removably supported on said base, means for accurately positioning said cart adjacent said station so that said basket is properly positioned between said arms, said selectively operable means being operative to swing said arms into engagement with said basket, to lift said basket and to tilt said basket into a readily accessible inclined position adjacent said station.

4. In a checkout system comprising a counter having a substantially horizontal top and a checker-cashier station, a basket positioned adjacent said station, said basket having flanges on respective opposite ends thereof, a pair of arms having respective opposite ends, one of said ends of each said arm being pivotally supported below said top and adjacent said station, the other of said ends of each said arm being swingable outwardly of said top and engagable beneath said flanges of said basket, reversible means for selectively pivoting said arms into respective engagement beneath said flanges to tilt said basket into a readily accessible inclined position relative to said top adjacent said station, each said other of said ends of each said arm being provided with means for limiting the sliding movement of said basket on said arms while said basket is being tilted.

5. In a checkout system comprising an elongated counter having an elongated horizontal top, said top having a cash register supporting portion adjacent the forward end thereof and a checked merchandise receiving portion adjacent the rearward end thereof, said counter being provided with a checker-cashier station between said supporting and receiving portions, a shopping cart having a base and a basket removably supported on said base, said basket having a lift means connected thereto, a pair of spaced arms each being pivotally mounted at one of its ends below said top and adjacent said station, each of the other ends of said arms being swingable outwardly from said counter, means for accurately positioning said cart adjacent said station so that said basket is properly positioned between said arms, reversible means for selectively swinging said arms outwardly for liftingly engaging said lift means on said basket and for tilting said basket in an upwardly inclined position with respect to said horizontal top.

6. In a checkout system in a retail mercantile establishment comprising an elongated counter having a forward end and rearward end and an elevated top therebetween said top including a cash register supporting portion adjacent said forward end and a checked merchandise receiving portion adjacent said rearward end, said counter being provided with a checker-cashier station for a check-cashier between said supporting and receiving portions and a bagging station at said rearward end, said check-cashier station and bagging station being on the same elongated side of said counter, the other side of said counter being provided with a shopping cart receiving station adjacent said checker-cashier station, said counter further being provided with a storage station for carts adjacent said cart receiving station and partially beneath said merchandise receiving portion of said top, a ramp extending between said cart receiving station and said storage station, a shopping cart at said cart receiving station having a removably mounted basket for merchandise supported on a base, said ramp including means for accurately positioning said shopping cart adjacent said checker-cashier station, and selectively operable tilting means between said cart receiving station and said checker-cashier station for removing said basket from said base and for tilting said basket on a longitudinal axis with respect to said counter toward said checker-cashier station whereby the merchandise within said basket is more readily removed directly from said basket by the checker-cashier and checked and deposited on said checked merchandise receiving portion without movement from said checker-cashier station by the checker-cashier.

7. In a checkout system in a retail mercantile establishment comprising an elongated counter having a forward end and rearward end and an elevated top therebetween said top including a cash register supporting portion adjacent said forward end and a checked merchandise receiving portion adjacent said rearward end, said counter being provided with a checker-cashier station for a checker-cashier between said supporting and receiving portions and a bagging station at said rearward end, said checker cashier station and bagging station being on the same elongated side of said counter, the other side of said counter being provided with a shopping cart receiving station adjacent said checker-cashier station, said counter further being provided with a storage station for carts adjacent said cart receiving station and partially beneath said merchandise receiving portion of said top, a ramp extending between said cart receiving station and said storage station, a shopping cart at said cart receiving station having a removably mounted elongated basket for merchandise supported on a base, said base being movably supported on two sets of wheels, said ramp including means for accurately positioning one of said sets of wheels with said shopping cart positioned adjacent said checker-cashier station, and selectively operable means for removing said basket from said base and for tilting said basket on an axis of said basket extending generally along the longitudinal axis of said basket toward said checker-cashier station.

8. In the checkout system as defined in claim 7 wherein said selectively operable means includes a pair of arms pivotally attached to said counter adjacent said checker-cashier station, and means for swinging said arms into lifting engagement with said basket and for tilting said basket into a readily accessible position toward said checker-cashier station.

9. In a checkout system comprising an elongated counter having a forward end and rearward end and an elevated top therebetween said top including a cash register supporting portion adjacent said forward end and a checked merchandise receiving portion adjacent said rearward end, said counter being provided with a checker-cashier station between said supporting and receiving portions and a bagging station at said rearward end, said checker-cashier station and bagging station being on the same elongated side of said counter, the other side of said counter being provided with a shopping cart receiving station adjacent said checker-cashier station, said counter further being provided with a storage station for carts adjacent said cart receiving station and partially beneath said merchandise receiving portion of said top, a ramp extending between said cart receiving station and said storage station, a shopping cart at said cart receiving station and having a base and a removable basket supported on said base, said ramp including means for accurately positioning said shopping cart adjacent said checker-cashier station, and a pair of arms pivotally attached to said counter adjacent said checker-cashier station, selectively operable means for swinging said arms into lifting engagement with said basket thereby removing said basket from said base and for tilting said basket into a readily accessible position toward said checker-cashier station.

References Cited by the Examiner

UNITED STATES PATENTS

| | | | |
|---|---|---|---|
| 2,129,394 | 9/1938 | Allen | 214—314 |
| 2,268,220 | 12/1941 | Marshall | 214—314 |
| 2,286,548 | 6/1942 | Jackson et al. | 186—1.1 |
| 2,317,438 | 4/1943 | Bradley | 186—1.1 |
| 2,479,530 | 8/1949 | Watson | 280—33.99 |
| 2,556,532 | 6/1951 | Goldman | 280—33.99 |
| 2,596,686 | 5/1952 | Hess | 186—1.1 |
| 2,604,190 | 7/1952 | Meyer | 186—1.1 |
| 2,943,707 | 7/1960 | Ramlose | 186—1.1 |
| 3,011,593 | 12/1961 | Foster | 186—1.1 |
| 3,028,931 | 4/1962 | Donovan | 186—1.1 |

SAMUEL F. COLEMAN, *Primary Examiner.*

ROBERT H. BRAUNER, CARL J. ALBRECHT,
*Examiners.*